United States Patent
Ma et al.

(10) Patent No.: US 6,599,245 B1
(45) Date of Patent: Jul. 29, 2003

(54) ULTRASOUND TRANSMISSION METHOD AND SYSTEM FOR SIMULATING A TRANSMIT APODIZATION

(75) Inventors: Qinglin Ma, Bothell, WA (US); John C. Lazenby, Fall City, WA (US); Lin Xin Yao, Bellevue, WA (US); Bruce A. McDermott, Bellevue, WA (US); David A. Petersen, Fall City, WA (US)

(73) Assignee: Siemens Medical Solutions USA, Inc., Iselin, NJ (US)

( * ) Notice: Subject to any disclaimer, the term of this patent is extended or adjusted under 35 U.S.C. 154(b) by 256 days.

(21) Appl. No.: 09/604,568

(22) Filed: Jun. 27, 2000

(51) Int. Cl.[7] ................................. A61B 8/00
(52) U.S. Cl. ...................... 600/437; 600/454
(58) Field of Search ................. 600/437, 443, 600/447, 454, 455, 448, 432

(56) References Cited

U.S. PATENT DOCUMENTS

| | | | | |
|---|---|---|---|---|
| 6,135,963 A | * | 10/2000 | Haider | 600/447 |
| 6,221,018 B1 | * | 4/2001 | Ramamurthy et al. | 600/443 |
| 6,241,674 B1 | * | 6/2001 | Phillips et al. | 600/443 |
| 6,282,963 B1 | * | 9/2001 | Haider | 73/602 |

* cited by examiner

Primary Examiner—Francis J. Jaworski
Assistant Examiner—Maulin Patel

(57) ABSTRACT

A system for controlling the point spread function of an ultrasound signal transmitted into a patient. In accordance with one embodiment of the invention, only a selected number of the transducer elements transmit a transmit pulse. The elements which do not transmit the pulse are selected in accordance with an apodization probability density function. In accordance with another aspect of the present invention, each transducer element transmits a variable portion of a transmit pulse in order to control the acoustic power of the signal transmitted from each element.

8 Claims, 6 Drawing Sheets

ULTRASOUND TRANSMISSION METHOD AND SYSTEM FOR SIMULATING A TRANSMIT APODIZATION

FIELD OF THE INVENTION

The present invention relates to medical imaging systems in general, and to ultrasound imaging systems in particular.

BACKGROUND OF THE INVENTION

Ultrasound imaging is a commonly used technique to non-invasively obtain images of a patient's internal body matter. One specification of an ultrasound system that directly relates to the quality of images that can be produced is the point spread function of the transmit beam used to apply ultrasound signals to the patient's body. To achieve the highest contrast resolution, the ultrasound beam that is transmitted into the patient should have as low sidelobes as possible.

One method of improving the quality of ultrasound images is to transmit signals from an ultrasound transducer with an apodization function that reduces the acoustic power of the signals transmitted from the sides of the transducer while allowing an increased acoustic power to be transmitted from those transducer elements near the center of the transducer. This has the effect of reducing the sidelobes in the transmit beam. In the past, such an apodization scheme was implemented using a separate voltage regulator in line with each individual piezoelectric crystal in the transducer. This approach is costly.

Given this problem, there is a need for an ultrasound transmitting mechanism that can improve the point spread function of a transmit beam without requiring individual voltage regulators in line with each transducer element.

SUMMARY OF THE INVENTION

The present invention is a system for simulating a transmit apodization without the use of voltage regulators in line with each transducer element. In one embodiment of the invention, individual transducer elements are selectively turned on or off such that each transducer element either transmits a pulse or does not. The selection of which transducer elements transmit a pulse is determined in accordance with an apodization probability function such as a Hamming function. With the probability function, fewer transducer elements near the edges of the transducer transmit a pulse while a greater number of transducer elements near the center of the transducer are selected to transmit a pulse. As a result, the combined transmit pulses from all the energized transducer elements simulate an apodized transmit beam.

In another embodiment of the invention, each transducer element transmits a variable portion of a transmit pulse. Transducer elements at the outer edges of the transducer transmit a lesser percentage of a pulse than those transducer elements located at the center of the transducer. A waveform generator associated with each transmitter element is supplied with parameters including the frequency of a pulse, the number of cycles to be transmitted, and a delay calculated for that element. From these parameters, the waveform generator synthesizes a variable portion of a transmit pulse to be transmitted.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
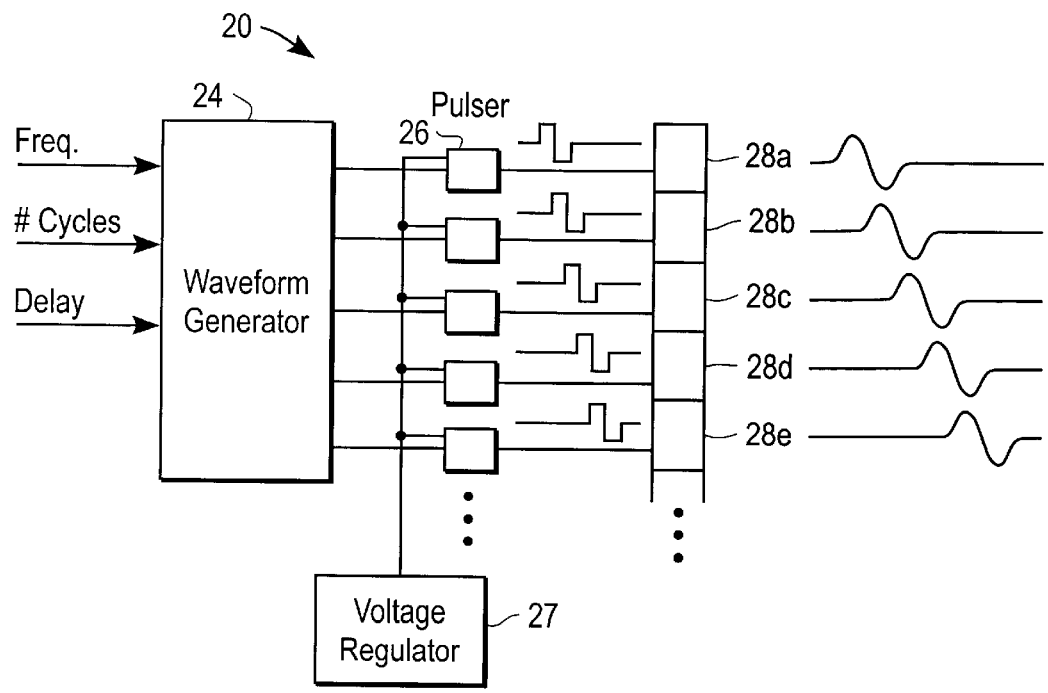
FIG. 1 illustrates the operation of a conventional ultrasound transmission system that transmits a number of pulses with no apodization.
Figure 1:
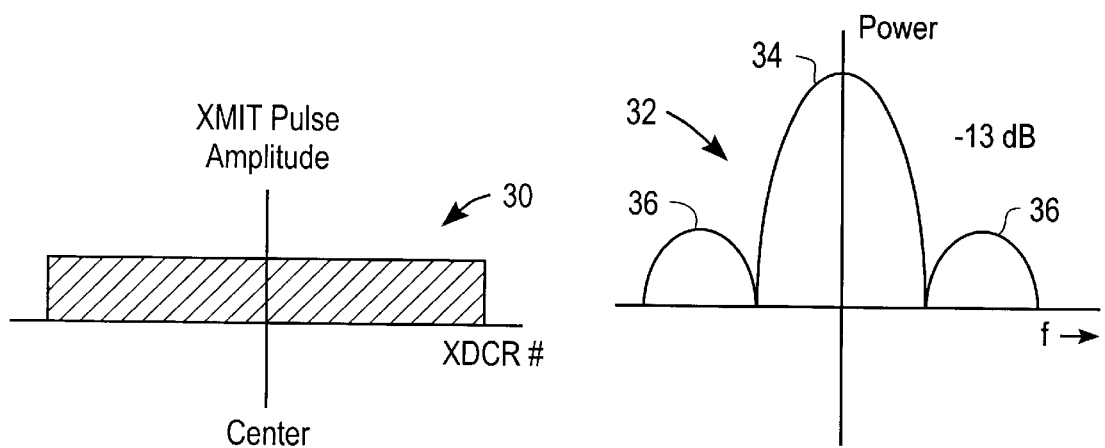

FIG. 1 illustrates a conventional ultrasound transmitting system 20 having a transducer 22 with a number of individual transducer elements 228a, 228b, 228c . . . that convert electronic signals into acoustic energy and vice versa. Supplying each transducer element with a driving waveform is a waveform generator 24 and pulser 26. The waveform generator produces a digital representation of the pulse to be transmitted from each transmitter element. The pulse is defined by a number of parameters including its frequency, the number of cycles, and its delay. The digital representation is converted into an analog waveform by the pulsers 26. In the case of a bipolar pulser, the pulsers are supplied with a positive and negative reference voltage by a voltage regulator 227. The digital representation specifies at each instant of time whether the output should be 0, the positive reference voltage, or the negative reference voltage. Note that the same reference voltage is supplied to all of the pulsers 26 by the voltage regulator 227. In order to focus the beam that is comprised of the individual pulses from each transducer element 28, the time at which the pulse is transmitted from the transducer element is varied. The waveform generator 24 receives a delay that is calculated for each transducer element depending on the desired focal location of the beam and places the delay in a counter. Once the counter is counted down to zero, the waveform generator 24 generates the appropriate waveform and the transducer element transmits an analog pulse.

If each transducer element 28 transmits a pulse with the same amplitude (i.e., with no apodization) as illustrated by the graph 30, the resulting beam has a point spread function illustrated by the graph 32 that has a relatively narrow main lobe 34 surrounded by relatively large side lobes 36. The magnitude of the side lobes 36 is typically 13 dB below the magnitude of the main lobe 34.

To image fine detail in the patient, it is desirable that the main lobe 34 be made as narrow as possible while decreasing the magnitude of the side lobes 36. An increase in the magnitude of the side lobes 36 with respect to the main lobe reduces the contrast resolution in an ultrasound image.

Figure 2:
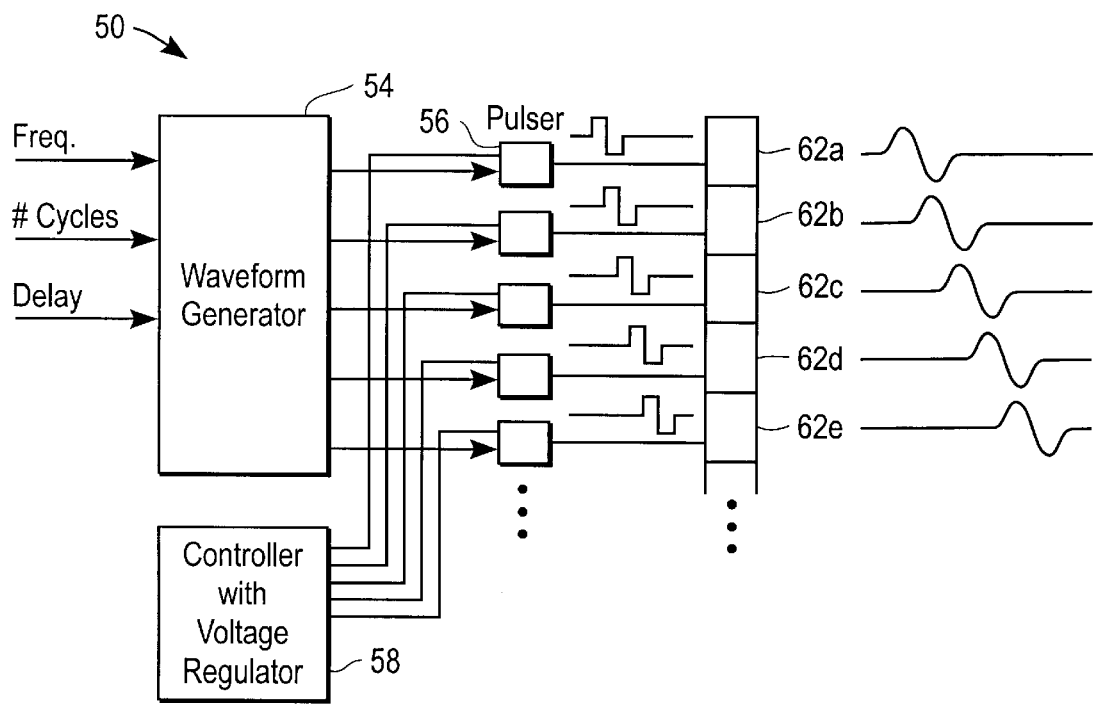
FIG. 2 illustrates a conventional ultrasound transmission system having voltage regulators in line with each transducer element to implement an apodization in a transmit beam.
Figure 2:
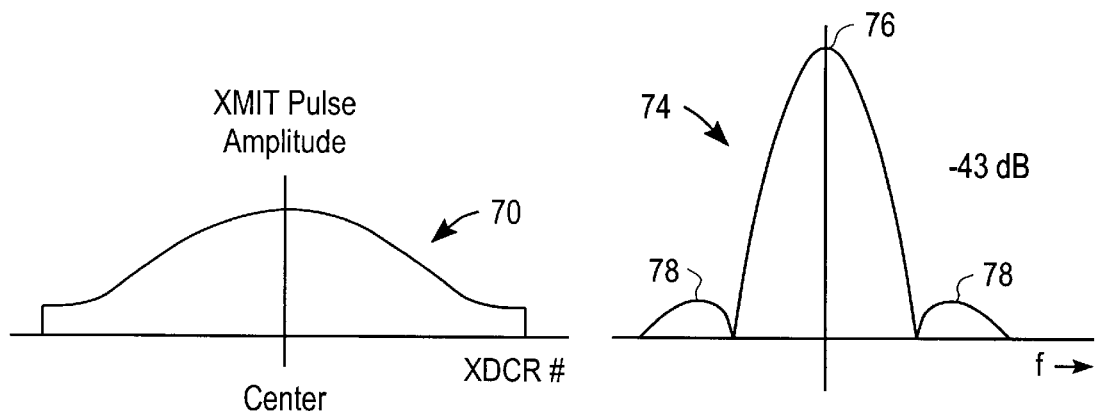

One method of controlling the point spread function of the ultrasound transmit beam is to use a transmit scheme 50 as shown in FIG. 2. Here, a transducer 52 includes a number of individual transducer elements 562a, 562b . . . which are supplied with a pulse waveform from a waveform generator 54 and pulser 56 as described above. Now, however, a controller 58 contains a separate voltage regulator for each transducer element 62 and controls each pulser 56 to regulate the magnitude of the pulse transmitted from each transducer element according to an apodization coefficient defined for each transducer element. In general, the amplitude of the pulses transmitted from the sides of the transducer is less than the amplitudes of the pulses transmitted from those elements located near the center of the transducer. The particular amplitude transmitted from each transducer element is generally determined in accordance with an apodization function as shown on the graph 70. One commonly used apodization function is a Hamming function. The use of the Hamming function produces a point spread function as shown in the graph 74 having a relatively wider main lobe 76 and relatively smaller side lobes 78 compared to no apodization. In theory, it is possible that the side lobes could have a magnitude that is approximately 43 dB below the magnitude of the main lobe 76.

The problem with the transmission system shown in FIG. 2 is that the voltage regulators within the controller 58 are expensive components which must be provided for each transducer element. The present invention therefore seeks to achieve the results obtained using an apodization function without the use of the individual voltage regulators 58.

Figure 3A:
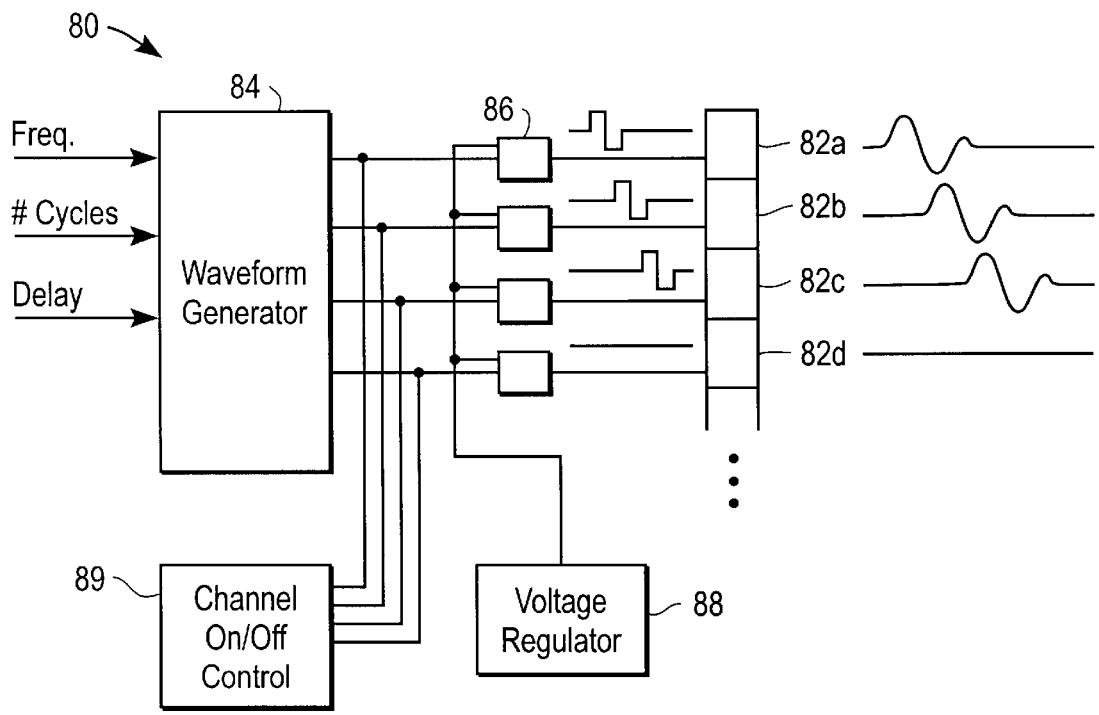
FIGS. 3A–3C illustrate an ultrasound transmission system for selectively transmitting a pulse from fewer than all the number of transducer elements in accordance with the first aspect of the present invention.

FIG. 3A illustrates one embodiment of an ultrasound transmission system according to the present invention. The ultrasound transmission system includes an ultrasound transducer 82 having a number of individual transducer elements 82a, 82b, 82c . . . that transmit ultrasound pulses into the patient and receive corresponding echo signals. Each of the individual transducer elements 82a, 82b, 82c . . . is supplied with a transmit pulse by a waveform generator 84 and a pulser 86. The waveform generator produces a digitized version of the transmit pulse given the parameters including the frequency of the pulse, the number of cycles to be transmitted, etc. In addition, counters within the waveform generator store a delay associated with each transducer element in order to steer the combined ultrasound beam.

The transmission system 80 also includes a controller 89 that operates to selectively disable certain transmitter elements from transmitting a pulse. The controller 89 may open a number of electronic switches disposed between the waveform generator 84 and the transducer elements 82. However, in the presently preferred embodiment of the invention, the controller 89 loads a predefined value into the counters of the transducer elements that are not to transmit. The waveform generator 84 recognizes this preloaded value and does not count down those counters in order to effectively turn off the corresponding transducer element. Each transducer element that transmits a pulse does so with substantially the same power because all are connected to the same voltage regulator 88.

Figure 3B:
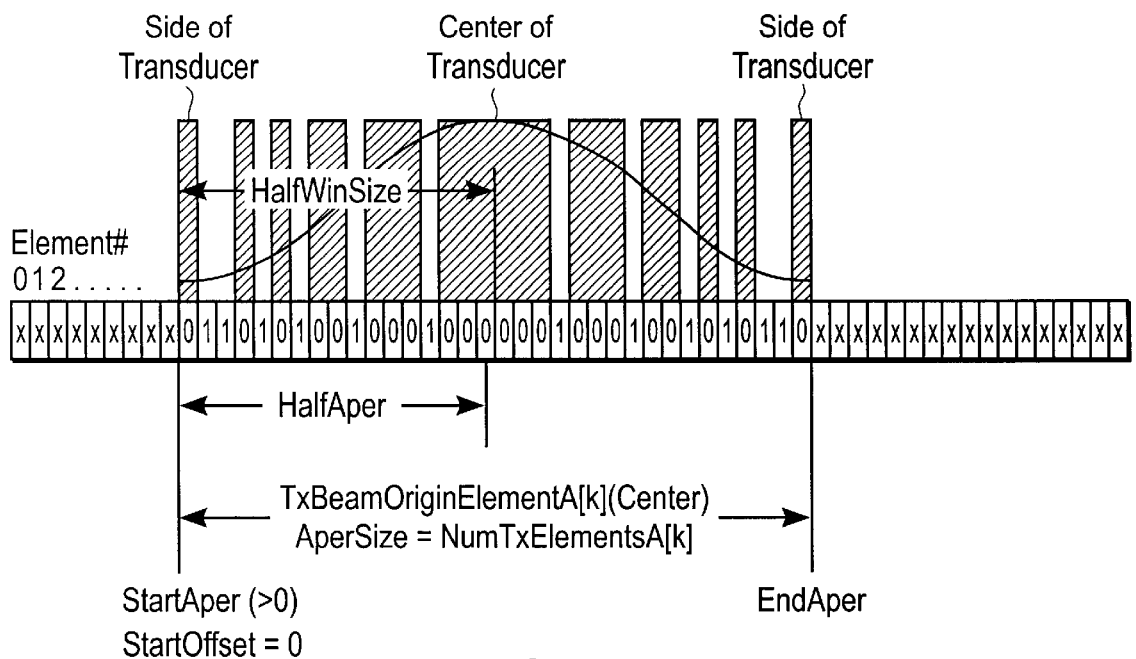

FIG. 3B shows a spatial graph illustrating which transducer elements transmit the ultrasound pulse and which do not. In general, the determination of which transducer elements are turned off is made in accordance with a probability function such as a Hamming probability density function or other function (such as a Gaussian function). However, it can be generally seen that a greater number of transducer elements located towards the center of the transducer 82 transmit a pulse while fewer of the transducer elements that are located at the sides of the transducer transmit a pulse.

The following is a pseudo-code listing of a software routine that calculates which transducer elements should transmit a pulse in accordance with the Hamming probability density function.

```
HalfAper=1.0 * AperSize/2;
HalfWinSize=ceil(HalfAper);
if (AperSize==2* HalfAper)
{// When AperSize is composed of even number of
    elements
for (i=0; i<HalfWinSize; i++)
// Assign HalfWinCoef[i]-from center (i=0) to side
    (i=HalfWinSize)
}
else
{ // When AperSize is composed of odd number of
    elements
for (i=0; i<HalfWinSize; i++)
// Assign HalfWinCoef[i]-from center (i=0) to side
    (i=HalfWinSize)
}
Remain=0.0; //initialization Remain
for (i=HalfWinSize-1; i>=0; i--)
{//Get the aperture values for the first half window
Remain=Remain+HalfWinCoefA[HalfWinSize-1-i];
    //Accumulate
Coefficient values
if (Remain>0.5)
{
WinAperA[i]=0; //Enable this element
Remains=Remains-1.0; //Take off 1.0 from the remain
}
else
WinAperA[i]=1; //Disable this element
}
//Get the aperture values for the second half window
for (i=0; i<HalfWinSize; i++)
    WinAper[AperSize-i]=WinAper[i];
```

Figure 3C:
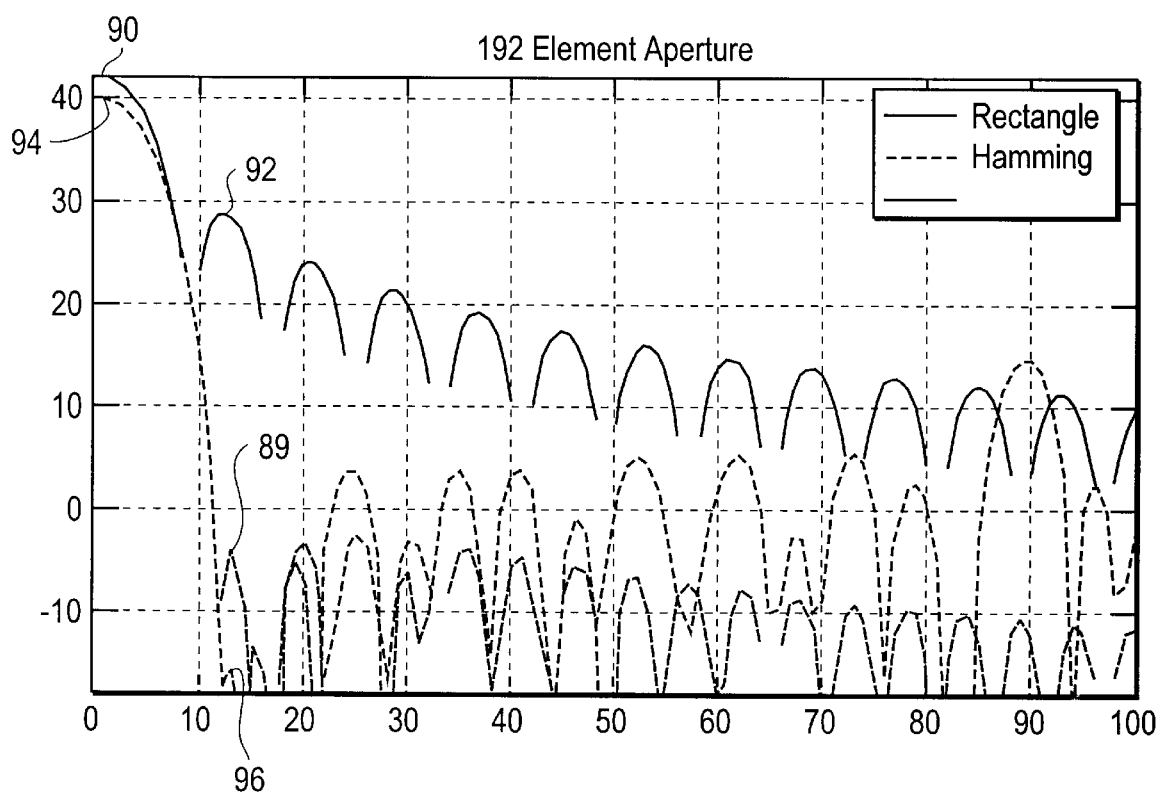

FIG. 3C illustrates simulated results of the transmission system shown in FIGS. 3A and 3B as compared to the systems shown in FIG. 1 and FIG. 2. A graph shows a main lobe 90 obtained using no apodization as described above in connection with FIG. 1. A side lobe 92 obtained with no apodization is generally 13 dB below the peak of the main lobe. Using an ultrasound transmission scheme as shown in FIG. 2 produces a main lobe 94 and a side lobe 96 having a magnitude that is approximately 43 dB below the magnitude of the main lobe 94. Using the transmission system shown in FIG. 3A according to the present invention, a side lobe 98 is produced having a side lobe approximately 36 dB below the magnitude of the main lobe 94

Figure 4A:
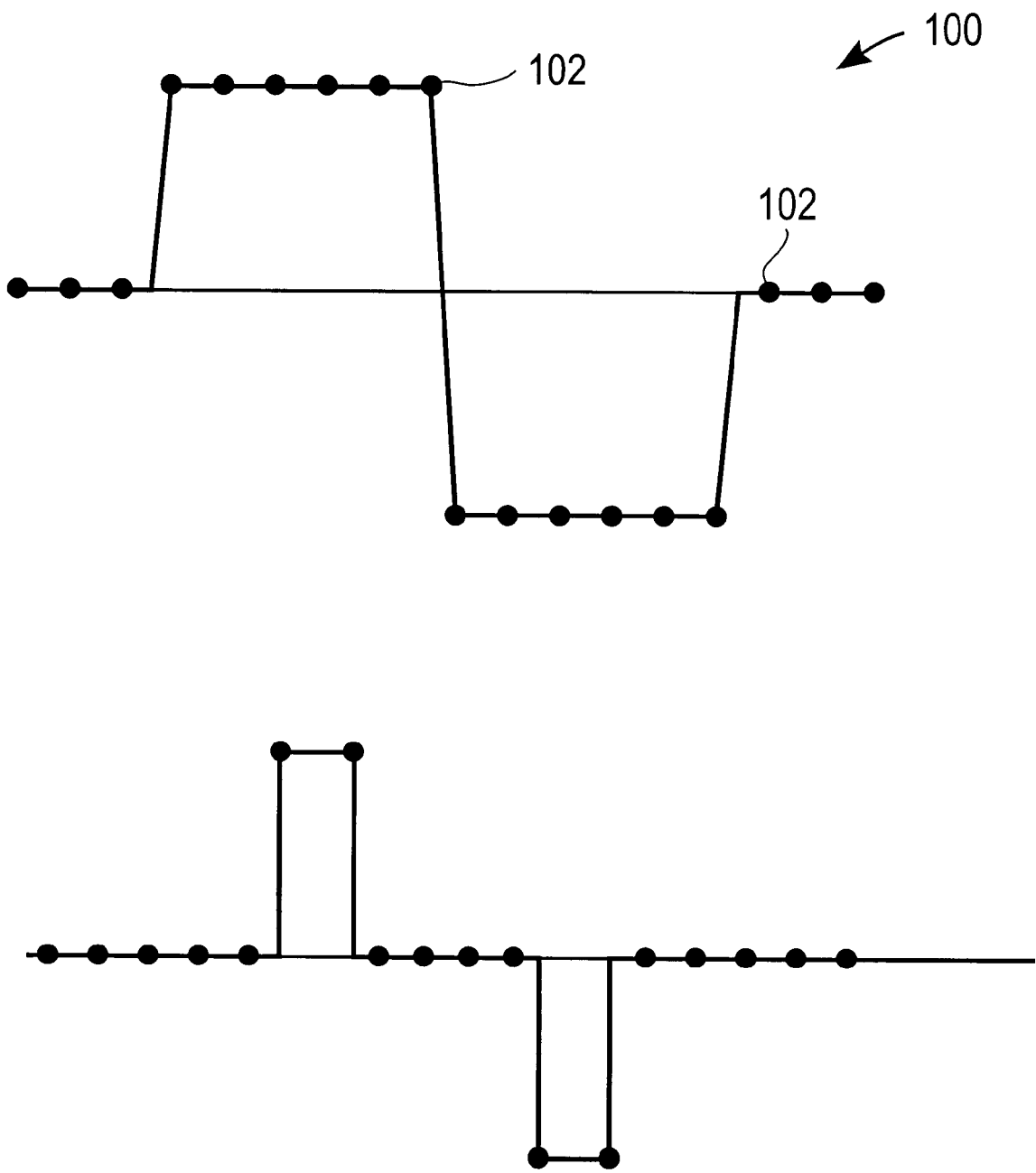
FIGS. 4A–4B illustrate an ultrasound transmission system in accordance with another aspect of the invention wherein each transducer element transmits a variable portion of a pulse.

FIG. 4A shows another method of synthesizing a transmit beam apodization without the use of voltage regulators for each transducer element. Here, a digital representation of a transmit pulse 100 is generated as a series of discrete sample points 102. In order to control the acoustic power of the transmit pulse delivered from each transducer element, an ultrasound transmission system in accordance with this aspect of the invention transmits a variable number of nonzero points 102.

Figure 4B:
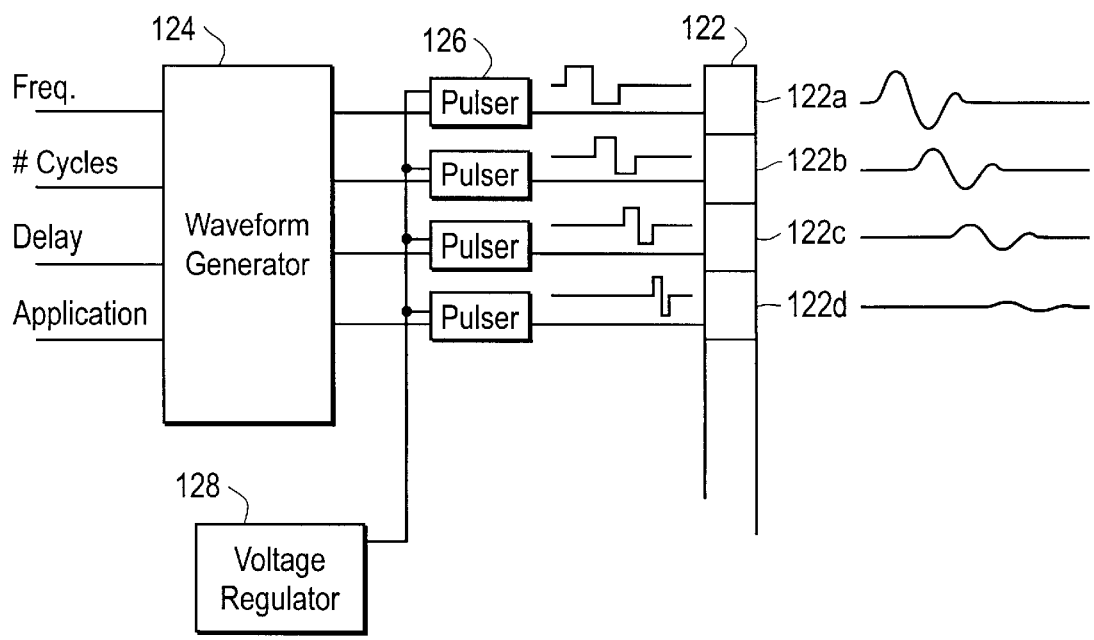

FIG. 4B shows an ultrasound transmission system constructed in accordance with this aspect of the present invention. The system includes an ultrasound transducer 122 having a number of transducer elements 122a, 122b, 122c . . . that transmit ultrasound pulses into the patient's body and receive corresponding echo signals.

Each transducer element 122 is driven by a separate waveform generator 124 that calculates and stores a transmit waveform according to a number of parameters including: frequency, number of cycles to be transmitted, a delay for a particular transducer element, and an apodization parameter that specifies the portion of the pulse to be transmitted. The apodization parameter specifies the percentage of each positive and negative going cycle of the waveform that is transmitted. For example, in a typical one cycle waveform, the transmit pulse consists of a positive going half cycle and a negative going half cycle. If each half cycle of the waveform is represented in the memory as 100 samples, and if the apodization parameter is set to 5%, then the waveform transmitted by the transducer element consists of 5 nonzero samples in the center of each half cycle.

By transmitting a variable portion of the transmit pulse, the acoustic energy of the pulses can be varied. Therefore, by controlling the apodization parameter for each transducer element such that those elements on the sides of the transducer transmit a lesser percentage of a pulse and those elements toward the center of the transducer transmit a greater percentage, the apodization can be synthesized. In addition, it has been determined the phase of the pulses produced from each of the transducer elements using the embodiment of the invention shown in FIGS. 4A and 4B is similar at all frequencies up to 200% of the transmit frequency. Therefore, any distortions created by differences in phase can be filtered with a high pass filter.

While the system shown in FIGS. 3–4A works well for relatively deep focal lengths, it should be noted that as the focal length decreases and the number of transducer elements used is decreased, there may be some artifacts created by transmitting less than the entire transmit pulse from each element. Therefore, other apodization techniques for short focal lengths may need to be used.

While the preferred embodiment of the invention has been illustrated and described using examples with a bipolar pulser, it will be appreciated that various changes can be made therein without departing from the scope of the invention. For example the invention can be applied to a unipolar pulser. It is therefore intended that the scope of the invention be determined from the following claims and equivalents thereto.

The embodiments of the invention in which an exclusive property or privilege is claimed are defined as follows:

1. A method of transmitting an ultrasound pulse into a patient from an ultrasound transducer having a number of transducer elements, comprising:

transmitting a substantially similar pulse from fewer than all of the number of transducer elements of an aperture, a greater density of transducer elements associated with transmitting the substantially similar pulse being located at a center portion than side portions of the aperture; and delaying the time at which the pulses from fewer than all of the number of transducer elements are transmitted such that all the pulses arrive at a focal point at substantially the same time.

2. The method of claim 1, further comprising:

selecting a number of the transducer elements that do not transmit a pulse in accordance with an apodization function.

3. The method of claim 2, wherein the apodization function is a Hamming window probability function.

4. The method of claim 1 wherein transmitting comprises transmitting the substantially similar pulse with a substantially same amplitude from each of the fewer than all of the number of transducer elements.

5. An ultrasound transmission system, comprising:

an ultrasound transducer having a number of transducer elements that convert electronic signals into acoustic energy and vice versa;

a waveform generator that supplies a waveform to be transmitted from each transducer element; and a controller that selectively disables one or more of the transducer elements such that the waveform is transmitted by fewer than all of the number of transducer elements of an aperture, a greater density of transducer elements associated with transmitting the waveform being located at a center portion than side portions of the aperture.

6. The ultrasound transmission system of claim 5, wherein the controller selectively disables one or more of the transducer elements in accordance with an apodization probability density function.

7. The ultrasound transmission system of claim 5 further comprising a voltage regulator operable to provide a substantially same power of each transducer element associated with transmission of the waveform.

8. A method of apodization for a transducer array having a plurality of transducer elements, the method comprising:

(a) determining an aperture; and (b) transmitting from fewer than all of the number of transducer elements in the aperture, a distribution of transducer elements used for transmitting having a density that varies as a function of an apodization function.

* * * * *